United States Patent [19]

Miskinis

[11] 4,395,382

[45] Jul. 26, 1983

[54] GLASSWARE STOPCOCK WITH FREEZE EXTRACTOR

[76] Inventor: Robert J. Miskinis, 9758 Airport Vista Rd., Santee, Calif. 92071

[21] Appl. No.: 305,619

[22] Filed: Sep. 25, 1981

[51] Int. Cl.³ .......................................... B01L 11/00
[52] U.S. Cl. .................................. 422/103; 29/237; 81/3.1 R; 215/296
[58] Field of Search ............... 251/309; 137/327, 315; 285/18; 215/295, 296; 422/99, 103; 29/237, 256, 234, 426.5; 138/96 R, 96 T; 81/3.1 R, 3.1 C, 3.34

[56] References Cited

U.S. PATENT DOCUMENTS 3,142,474 7/1964 Nelson .................................. 251/309
3,882,884 5/1975 Leopold et al. ..................... 137/327

FOREIGN PATENT DOCUMENTS 9792 of 1891 United Kingdom ................ 215/296

OTHER PUBLICATIONS

Sargent-Welch-1971; pp. 309, 1008, 1010.

Primary Examiner—Michael S. Marcus
Attorney, Agent, or Firm—George J. Rubens

[57] ABSTRACT

A glassware stopcock for laboratory equipment includes a glass body having a Teflon stopcock plug with an extractor for extracting the plug from its bore when the plug becomes frozen therein and unable to rotate. The extractor includes a threaded cylindrical portion formed on the stem of the plug with an extractor nut threaded on the threaded section and adapted to engage the valve body for extracting the plug from its bore.

4 Claims, 4 Drawing Figures

GLASSWARE STOPCOCK WITH FREEZE EXTRACTOR

BACKGROUND OF THE INVENTION

The present invention relates to glassware for chemical laboratories and pertains particularly to an improved stopcock having an extractor.

Glassware in the form of vessels, flasks, tubing and the like is used extensively throughout chemical research and testing laboratories. It is often desirable that systems be set up connecting a number of vessels together for the transfer of liquids or gasses between vessels. Such systems utilize glass tubing for such transfer.

It is often necessary to control the flow of either gas or liquid to and from vessels and the like. Such control is normally accomplished by means of glass stopcocks. Where sealing is particularly critical, stopcocks utilizing a Teflon plug have been used. These however frequently freeze and cannot be either opened or closed. Such conditions can be hazardous where immediate opening or closing of a stopcock is essential.

Sometimes silicone grease has been used on such plugs. This however has the problem of contaminating the fluid with the silicone grease.

It is therefore desirable that an improved stopcock having releasing means be available.

SUMMARY AND OBJECTS OF THE INVENTION

It is the primary object of the present invention to provide an improved stopcock for glassware.

In accordance with the primary aspect of the present invention, a stopcock for glassware includes a teflon stopcock plug having a threaded stem with an extractor nut disposed on the stem and engagable with the valve body for at least partially extracting the plug from the valve bore.

BRIEF DESCRIPTION OF THE DRAWINGS

The above and other objects and advantages of the present invention will become apparent from the following description when read in conjunction with the drawings, wherein.

DETAILED DESCRIPTION OF A PREFERRED EMBODIMENT

Figure 1:
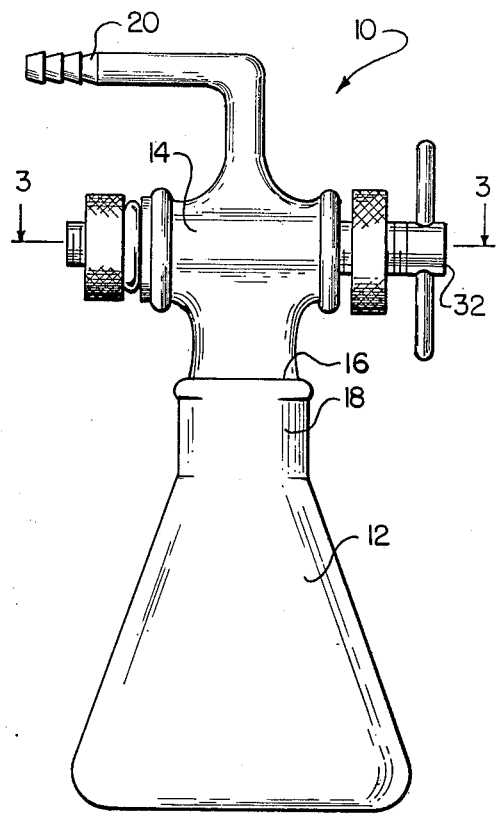
FIG. 1 is a side elevation view showing a vessel having a stopcock in accordance with the invention in position for use.

Turning to the drawings, particularly FIG. 1, there is illustrated a stopcock in accordance with the invention designated generally by the numeral 10 mounted in the neck of a flask 12. The stopcock includes a glass body 14 having connector end 16 extending into the neck or mouth 18 of the flask 12. The stopcock includes an outlet and/or extension having a hose connection 20.

Figure 2:
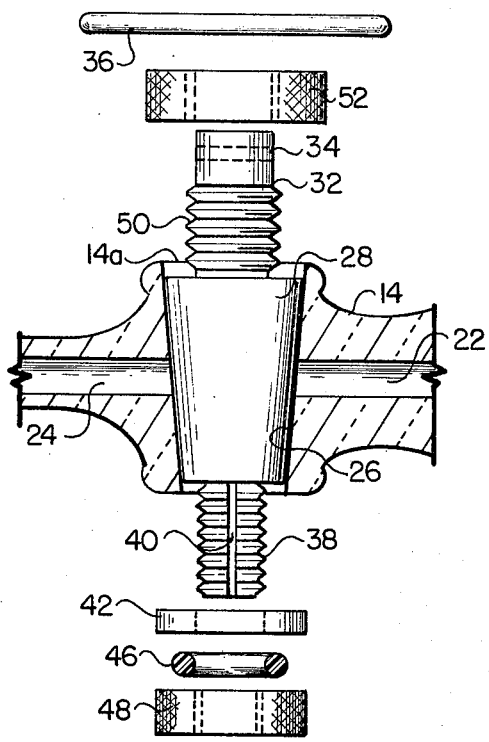
FIG. 2 is an exploded view of the stopcock of FIG. 1.
Figure 3:
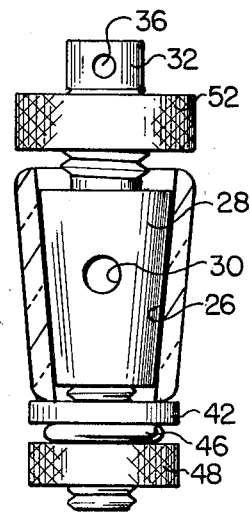
FIG. 3 is a view taken generally on line 3—3 of FIG. 1.
Figure 4:
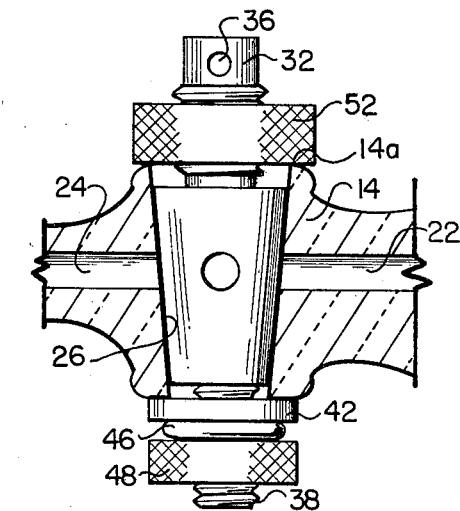
FIG. 4 is a side elevation view, partially in section, showing the extractor in use.

Turning to FIGS. 2 through 4, details of the valve construction are better illustrated. The valve body 14 is of a glass construction and includes an inlet passageway 22 and an outlet passageway 24 disposed coaxially and intersected by a transverse tapered bore 26 having a generally standard taper. Mounted within the tapered bore 26 is a stopcock plug 28 made of a polymer resin such as that sold under the mark Teflon, having a transverse bore 30 for providing selected communication between the passages 22 and 24.

The plug includes a stem 32 extending from the upper end thereof and including a cross bore 34 in which is mounted a cross pin 36 for rotation of the plug. The cross handle 36 is removable to permit mounting and/or removal of retracting nut 52 on the threaded stem 50.

The plug is held in place in the tapered bore by means of a lower stem 38 having threads thereon and including a key way 40 which is engaged by a key in the bore of a washer 42 which mounts thereon and rotates therewith in engagement with the lower end of the housing. The washer 42 is preferably of a Teflon material likewise, and a Butyl O-ring 46 engages the outside of the washer and a retainer and adjustment nut 48 which is preferably made of a material such as that sold under the mark Delrin. The nut 48 together with the washers 42 and 46 operate to retain the plug 28 in place and apply sufficient tension or pressure thereon to maintain the plug seated to avoid leakage therearound.

In order to extract the nut sufficiently to permit rotation thereof should the nut become jammed or frozen, a retractor assembly comprises a threaded section 50 extending along the upper end of the stem 32 between the cross handle 36 and the upper end of the tapered body of the plug and tapered bore of the housing 14. A retractor nut 52 is threaded onto the threaded portion of the stem 50 and is movable into pressure engagement with the housing 14 at the shoulders thereof 14a surrounding the bore 26. With this extractor nut, sufficient pressure can be applied on the plug and housing to at least partially retract or withdraw the plug 28 from the bore 26 and at least loosen the plug from its engagement with the tapered walls of the bore to permit rotation thereof.

As shown in FIG. 4, the retractor nut 52 is moved downward into engagement with the surrounding shoulder 14a to pull the plug partially out of engagement with the tapered walls of the bore 26. The washer 46 has sufficient resilience to enable the plug to be retracted without the necessity of loosening the retainer nut 48.

In the preferred construction, at least the minor diameter of the threads on stem 50 is less than the maximum diameter of the larger upper end of tapered plug 28 so that when handle 36 is in place the nut 52 cannot be removed and lost.

With this arrangement, the plug can be sealingly seated within its bore to ensure secure sealing of the valve and yet may be sufficiently loosened when necessary to permit rotation thereof should sticking occur.

The present invention is particularly essential for Teflon plugs due to the tendency thereof to stick or freeze in the glass body.

While I have illustrated and described my invention by means of specific embodiments, it is to be understood that numerous changes and modifications may be made therein without departing from the spirit and scope of the invention as defined in the appended claims.

Having described my invention, I now claim:

1. A glassware stopcock comprising the combination of:

a glass body member having an inlet and an outlet and
   a through passage communicating between the inlet and the outlet.

said body member having a tapered transverse bore intersecting said passage, a smooth, reusable, substantially rigid polymeric, tapered stopcock plug member complimentary to and rotatably mounted in and capable of sealing engagement in said bore, and rotatable between open and closed positions of said passage, resilient retaining means mounted at the smaller (one) end of said plug for securing said plug in said bore, said plug member having a threaded stem portion extending from the larger diameter end of said tapered plug and beyond said body member, means for rotating said plug member between said open and closed positions, and a finger operable one piece retractor nut having a textured outer surface and mounted on said threaded stem (at the other end of said plug) and engageable with the glass body member for applying an axial force to break the sealing engagement of said plug for at least partially retracting said stem from said bore to enable the plug to be rotated between positions against said means and being smaller in length than said threaded stem portion.

2. The stopcock of claim 1, wherein said stopcock plug is capable of sealing engagement throughout its entire surface with the surface of the transverse bore.

3. The stopcock of claim 1, wherein
the diameter of said threaded stem is less than the maximum diameter of said plug, and
said means for rotating said plug between said positions comprising a cross handle removably mounted in the stem to enable the nut to be disassembled from the stem portion for purposes of sterilization.

4. The stopcock of claim 1, wherein said threaded stem portion is less in diameter than the maximum diameter of the plug member to enable the plug member to be seated in the transverse bore below its rim.

* * * * *